United States Patent [19]
Hill, deceased

[11] 3,710,871
[45] Jan. 16, 1973

[54] ROTARY FURROWING TOOL

[76] Inventor: Emmons F. Hill, deceased, late of Route 4, Knoxville, Tenn. 37914 Frank L. Hill, administrator

[22] Filed: Dec. 21, 1970

[21] Appl. No.: 99,825

[52] U.S. Cl. .................172/122, 172/123, 172/536, 172/540
[51] Int. Cl. .............................................A01b 33/00
[58] Field of Search......172/120, 122, 123, 118, 119, 172/539, 541, 554, 50, 190, 382, 536, 60; 111/18, 87

[56] References Cited

UNITED STATES PATENTS

| | | | |
|---|---|---|---|
| 3,538,987 | 11/1970 | Taylor | 172/123 X |
| 3,604,515 | 9/1971 | Kipping | 172/123 X |
| 2,685,243 | 8/1954 | Cole | 172/536 |

FOREIGN PATENTS OR APPLICATIONS

| | | | |
|---|---|---|---|
| 605,231 | 5/1960 | Italy | 172/122 |
| 476,252 | 7/1915 | France | 172/536 |
| 667,974 | 9/1964 | Italy | 172/536 |

*Primary Examiner*—Robert E. Pulfrey
*Assistant Examiner*—Stephen C. Pellegrino
*Attorney*—Lawrence E. Laubscher

[57] ABSTRACT

An improved rotary furrowing tool is disclosed including a cylindrical rim, cutting blade means for cutting a vertically arranged longitudinal slit in the earth's surface, and dig-out tooth means for pulverizing and removing the soil adjacent the slit. The cutting blade means includes at least one blade secured to the rim adjacent one lateral edge, said blade extending radially outwardly beyond the peripheral surface of the rim. The dig-out tooth means comprise circumferentially arranged teeth that extend radially outwardly from the peripheral surface of the rim a distance less than the extremity of said cutting blade means. The disclosed arrangement is particularly suitable for forming a furrow in unplowed ground.

6 Claims, 3 Drawing Figures

PATENTED JAN 16 1973 3,710,871

INVENTORS
Emmons F. Hill

BY  *Lawrence E. Laubscher*
ATTORNEY

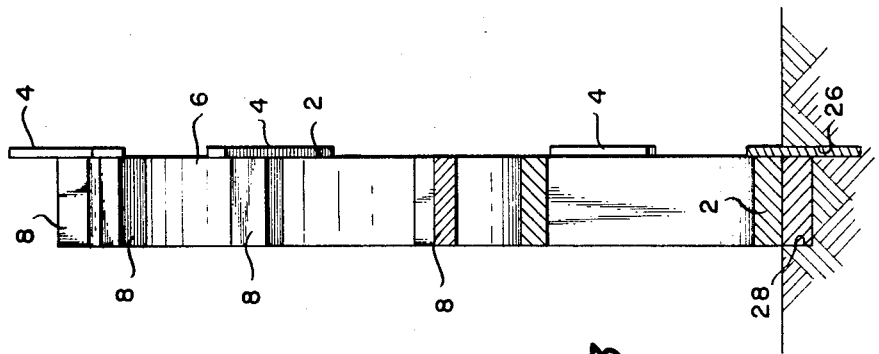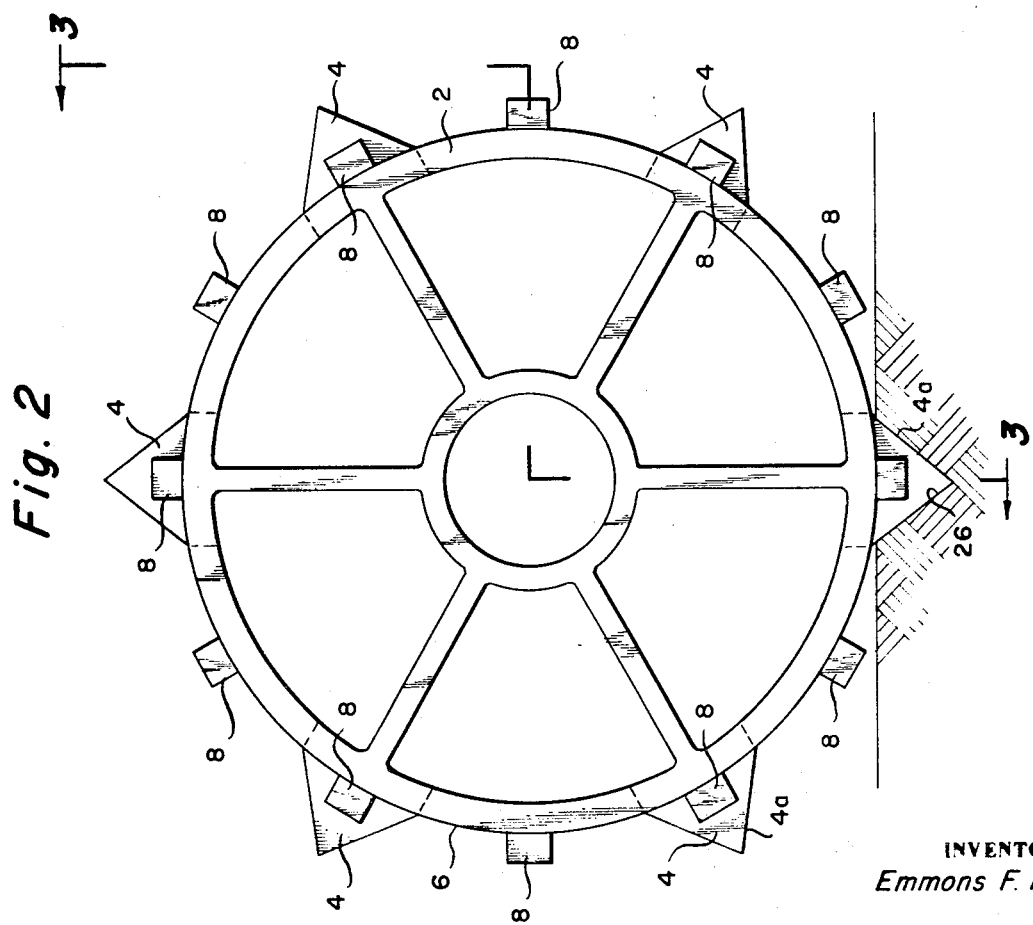

ROTARY FURROWING TOOL

In accordance with the present invention a rotary furrowing tool is provided for digging a furrow in the earth's surface. As evidenced by the prior patents to Shonts U.S. Pat. No. 2,708,866, Redwood U.S. Pat. No. 2,234,778, Dontje U.S. Pat. No. 2,314,035, and Parker U.S. Pat. No. 442,538, various types of rotary implements have been proposed for opening the ground for agricultural uses. Whereas the prior art is concerned with making spaced holes or depressions in the top soil, the present invention relates to making a continuous furrow of a desired width and depth in sod for the planting of corn or other seed. The sod is then chemically treated to stop its growth.

The primary object of the present invention is to provide an improved rotary furrowing tool for forming a furrow in the earth's surface including, in combination, a generally cylindrical rim, circumferentially-spaced radially extending cutting blade means secured to the rim adjacent one lateral edge for slicing a continuous vertically-arranged longitudinally extending slit in the earth's surface, and dig-out tooth means extending radially outwardly from the peripheral surface of the rim for pulverizing and removing the soil adjacent the slit formed by the cutting blade means to form a furrow in communication at one side with the vertical slit. The depth of both the slit and the furrow is regulated by the rim. The coaction of the rim, the cutting blade means, and the dig-out tooth means is such that a furrow can be made in previously unplowed ground, thereby making this tool useful for seeding corn or other grain crops on the contour of slopes covered with sod which might be subject to erosion if conventional seed bed preparation were used.

A more specific object of the invention is to provide a rotary furrowing tool of the type described above, wherein the rim is rotatably connected with a frame which has a drive means connected therewith for rotatably driving said rim, and further including a transport means for transporting the frame at a given velocity while the above mentioned drive means operates to rotate the rim at a greater circumferential velocity than the linear velocity of said frame. An attached trailing planter can then be used to seed corn or other seed in sod eliminating seed bed preparation and thus eliminating a considerable amount of time and expensive labor. The sod is then chemically treated to stop its growth.

The tool can be used as a single or multiple unit with as many wheels placed together as needed on either a common axle or on individual axles.

The tool can also be used to seed corn or other grain crops on the contour of slopes covered with sod which might be quite subject to erosion if conventional seed bed preparation were utilized.

Other objects and advantages of the invention will become apparent from a study of the following specification, when viewed in light of the accompanying drawing, in which:

FIG. 2 is a detail of the rotary furrowing tool;

FIG. 3 is a sectional view taken along line 3—3 of FIG. 2.

Figure 1:
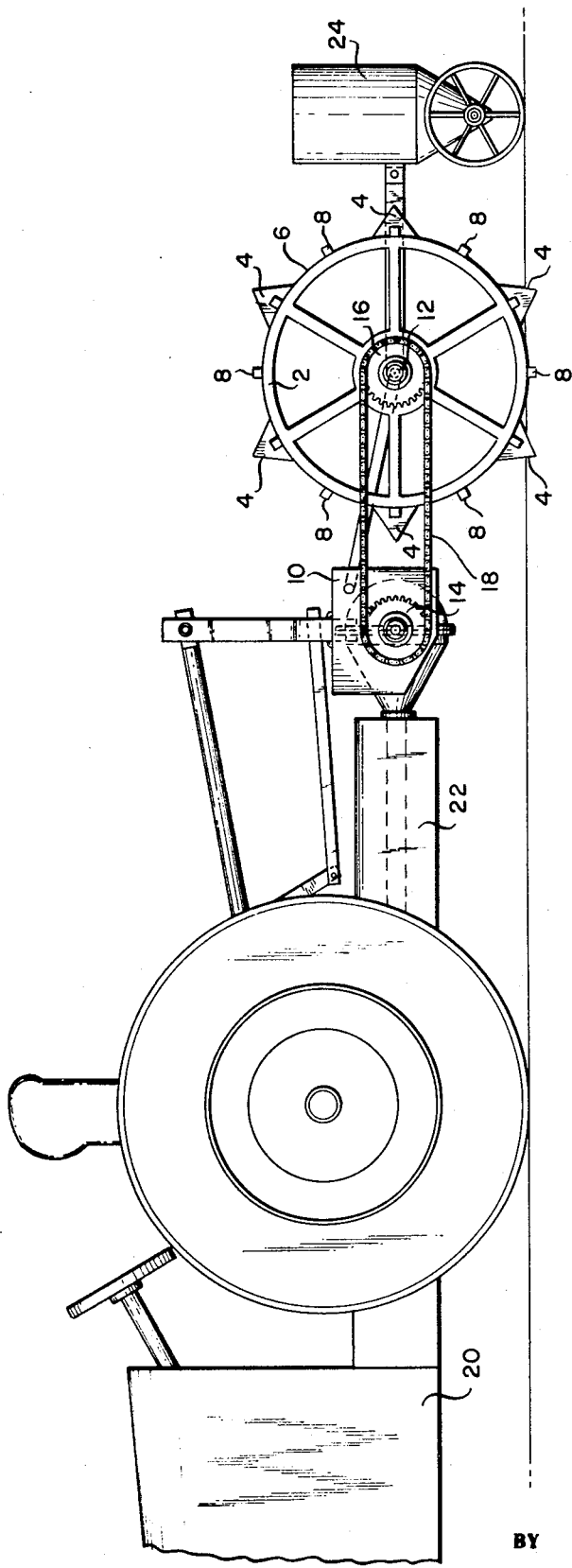
FIG. 1 is a side elevation view of the furrowing and seeding apparatus utilizing the rotary furrowing tool of the present invention.

Referring first more particularly to FIGS. 1 and 2, the rotary furrowing tool comprises a rim 2 having cutting blades 4 rigidly attached thereto adjacent one lateral edge thereof, said blades extending radially outwardly beyond the peripheral surface 6 of the rim. Also extending radially outwardly from the peripheral surface of the rim are a plurality of circumferentially arranged dig-out teeth 8. The rim 2 is rotatably connected with the frame 10 by bearing means 12, said rim being driven from a suitable power source 22 via drive sprocket 14, sprocket chain 18, and driven sprocket 16. The frame 10 is adapted for transport by conventional transport means 20. Connected with the frame rearwardly of the rotary furrowing tool is a seed dispensing means 24.

As shown in FIG. 3, the cutting blades 4 are secured to the lateral edge of rim 2 via bolts or other appropriate means. The dig-out teeth 8 are usually integral with or welded to the peripheral surface 6 of rim 2 and extend the entire width of the rim. At least the forward portions of the cutting blades are provided with knife edges 4a.

OPERATION

As the transport means 20 moves the frame 10 at a given velocity, the power means 22 rotates rim 2 with a circumferential velocity greater than the linear velocity of the frame 10. In so doing, cutting blades 4 slice a continuous relatively narrow vertically-arranged longitudinally extending slit 26 (FIG. 3) in the earth's surface, whereupon the dig-out teeth 8 pulverize the soil adjacent the slit to form the furrow 28 in FIG. 3 which communicates on one side with the slit 26. The depth of both the vertical slit 26 and the furrow 28 is regulated by the rim 2. The seed dispensing means 24 then deposits seeds into said furrow 28.

While in accordance with the provisions of the Patent Statutes the preferred forms and embodiments of the invention have been illustrated and described, it will be apparent to those skilled in the art that various changes and modifications may be made without deviating from the invention set forth in the following claims.

What is claimed is:

1. A rotary tool for forming a furrow in the earth's surface, comprising a frame (10);

means (20) for transporting said frame at a predetermined velocity;

a generally cylindrical rim (2) rotatably mounted on said frame;

drive means (14, 16, 18 and 22) connected with said frame for rotating said rim at a greater circumferential velocity than said predetermined velocity of said frame;

cutting blade means connected with said rim for forming a continuous relatively narrow vertically-arranged longitudinally extending slit in the earth's surface, said cutting blade means including a plurality of cutting blades (4) secured to said rim adjacent one lateral edge thereof and extending radially outwardly beyond the peripheral surface of said rim; and dig-out tooth means for forming a furrow in the earth's surface in communication at one side with said vertical slit, said dig-out tooth means including a plurality of dig-out teeth (18) circumferentially arranged around, and extending radially outwardly from, the peripheral surface of said rim, said cutting blades extending radially outwardly from the peripheral surface of said rim a greater distance than said dig-out teeth, whereby the depth of said slit exceeds the depth of said furrow.

2. Apparatus as defined in claim 1, and further wherein the number of said dig-out teeth exceeds the number of said cutting blades.

3. Apparatus as defined in claim 2, wherein each of the dig-out teeth is generally lug-shaped.

4. Apparatus as defined in claim 3, wherein each of said cutting blades includes adjacent its forward portion a cutting edge.

5. Apparatus as defined in claim 3, wherein each said lug shaped tooth extends substantially across the entire width of said peripheral surface of said rim.

6. Apparatus as defined in claim 1, and further including seed dispensing means connected with said frame for depositing seeds into said furrow.

* * * * *